United States Patent [19]

Engström et al.

[11] Patent Number: 5,784,363
[45] Date of Patent: Jul. 21, 1998

[54] ARRANGEMENT IN A MULTI-USER SYSTEM

[75] Inventors: Bo Engström; Roger Larsson, both of Luleå, Sweden

[73] Assignee: Telia AB, Farsta, Sweden

[21] Appl. No.: 615,172

[22] PCT Filed: Sep. 12, 1994

[86] PCT No.: PCT/SE94/00841

§ 371 Date: Apr. 1, 1996

§ 102(e) Date: Apr. 1, 1996

[87] PCT Pub. No.: WO95/10144

PCT Pub. Date: Apr. 13, 1995

[30] Foreign Application Priority Data

Oct. 1, 1993 [SE] Sweden .................................. 9303213

[51] Int. Cl.$^6$ ..................................................... H04J 1/16
[52] U.S. Cl. .......................... 370/332; 370/343; 455/65; 455/67.3
[58] Field of Search ........................... 370/319, 252, 370/322, 343, 344, 328, 329, 330, 331, 332, 333; 455/34.1, 34.2, 52.1, 52.3, 53.1, 54.1, 62, 63, 67.3, 71, 65, 69, 517, 422, 436, 439, 450, 452, 507, 509, 513; 375/345, 346

[56] References Cited

U.S. PATENT DOCUMENTS

| 4,126,828 | 11/1978 | Kumagai ........................... 455/207 |
|---|---|---|
| 4,509,206 | 4/1985 | Carpe et al. ...................... 455/234.2 |
| 4,955,073 | 9/1990 | Sugayama ......................... 455/161.3 |
| 5,058,133 | 10/1991 | Duncanson et al. ................ 370/260 |
| 5,093,924 | 3/1992 | Toshiyuki et al. ................ 455/62 |
| 5,142,691 | 8/1992 | Freeburg et al. .................. 455/38.2 |
| 5,203,012 | 4/1993 | Patsiokas et al. ................. 455/34.1 |
| 5,212,831 | 5/1993 | Chuang et al. .................... 455/62 |
| 5,282,222 | 1/1994 | Fattouche et al. ................. 375/200 |
| 5,321,847 | 6/1994 | Johnson, Jr. ...................... 455/207 |
| 5,412,658 | 5/1995 | Arnold et al. ..................... 370/330 |
| 5,548,809 | 8/1996 | Lemson ............................. 455/34.1 |
| 5,561,847 | 10/1996 | Kataoka ............................ 455/34.2 |
| 5,598,436 | 1/1997 | Brajal et al. ..................... 375/297 |

FOREIGN PATENT DOCUMENTS

| 0 610 988 | 8/1994 | France . |
|---|---|---|
| 36 21 679 | 1/1988 | Germany . |
| WO 91/18458 | 11/1991 | WIPO . |

Primary Examiner—Alpus H. Hsu
Assistant Examiner—Kwang B. Yao
Attorney, Agent, or Firm—Oblon, Spivak, McClelland, Maier & Neustadt, P.C.

[57] ABSTRACT

A multi-user system includes radio channels which are independent and uncorrelated for different users. The system operates with frequencies which, due to multi-path propagation, are more or less attenuated for one user and more or less amplified for another user. Elements are arranged to detect or measure the attenuation/amplification for the different frequencies. The elements also prevent signal or information transmission at frequencies which drop below a predetermined lowest attenuation by disconnecting the frequency or frequencies in question and connecting a corresponding number of frequencies which pass the attenuation value criterion.

20 Claims, 2 Drawing Sheets

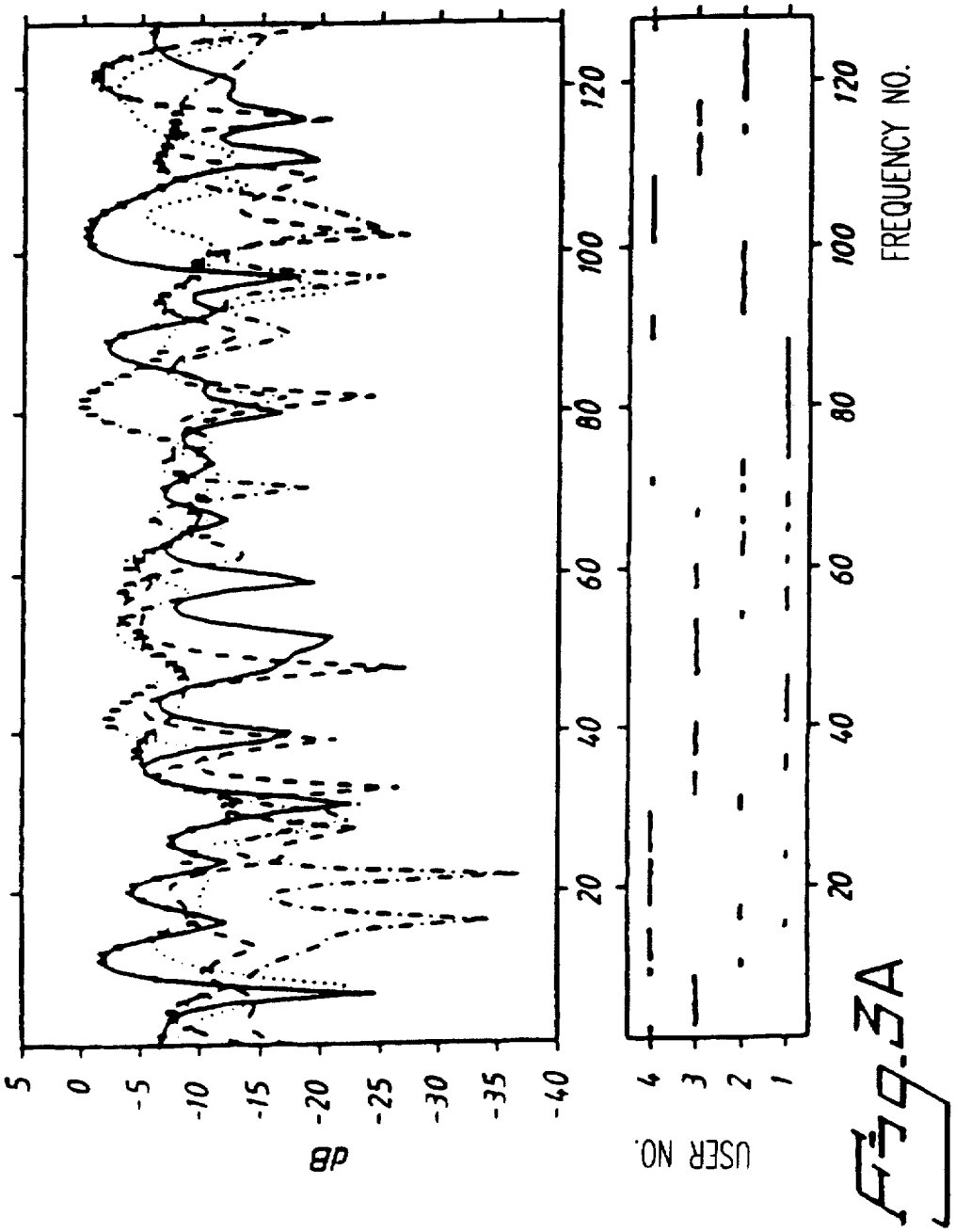

ARRANGEMENT IN A MULTI-USER SYSTEM

BACKGROUND OF THE INVENTION

FIELD OF THE INVENTION

The present invention relates to an arrangement in a multi-user system comprising radio channels which are independent and uncorrelated for different users and in which frequencies, due to multi-path propagation, are more or less attenuated for one user and more or less amplified for another user.

DISCUSSION OF THE BACKGROUND

There are time-dispersive radio channels in which signalling occurs in an environment which causes reflections with significant amplitude and long delays. In have delays which are longer than the symbol length. By this is meant that different frequencies in the spectrum, of the signal are dispersed in different ways. In particular, it can be noticed that the different frequencies are attenuated by different amounts. The traditional methods for signalling in such an environment are, among others, different arrangements for achieving diversity, use of equalizers, use of a so-called RAKE receiver or suitable channel coding.

OFDM (Orthogonal Frequency Division Multiplex) is a form of modelling in which a broadband signal is multiplexed on many narrow-band channels, normally several hundred. The narrow-band channels can be packed very tightly since the fact is utilized, that the channels are orthogonal when the channel separation (Hz) is equal to 1/symbol length for rectangular symbols. OFDM is normally implemented with the aid of special circuits which carry out FFT (Fast Fourier Transform) very rapidly.

In OFDM signalling, channel coding is normally used for reducing error probability. OFDM combined with channel coding is called COFDM (Coded Orthogonal Frequency Division Multiplex). Systems which use this form of signalling have in recent years been implemented for different types of broadcasting, that is to say one-way systems for digital radio broadcasting and for high-resolution digital TV. More recently, interest has also begun to be shown for utilizing the good characteristics of OFDM for two-way communication, for example in mobile systems, radio LANs and for point-to-multipoint applications.

In traditional OFDM systems, attempts are usually made to cope with the frequency-selective fading by coding out the errors which arise in the frequencies which are highly attenuated.

Quite generally there is a need to be able to eliminate the fading problem in a simpler manner than, for example, by coding methods. The invention intends to solve this problem, among others. In a system of this type, there is the requirement that it should be possible to hold the frequency attenuation above certain predetermined values for all users in the system. The invention also intends to solve this problem.

SUMMARY OF THE INVENTION

That which can be mainly considered to be characterizing of an arrangement according to the invention is that elements are arranged to sense or measure the attenuation/amplification at the different frequencies and to prevent signal links or information transmission at frequencies which drop below a predetermined lowest permitted or stipulated attenuation.

In one embodiment of the concept of the invention, the multi-user system comprises both uplinks and downlinks. In the uplinks or outstations of a basestation, the elements/basestation measure(s) the attenuation at the different frequencies or, respectively, the different outstations. On the basis of the measurement made, the elements/basestation distribute(s) the frequencies at which the different outstations are to signal or send information. The multi-user system in the embodiment can also include downlinks, that is to say basestation to outstations. Each of the latter outstations or said elements measures the attenuation for each frequency. The result of the measurement is signalled to the basestation/said elements which distribute(s) the frequency.

In a preferred embodiment, an OFDM system is utilized in which an identifiable data symbol for each carrier wave used can be easily extracted. When a respective identifiable data symbol appears, the possibility exists of obtaining attenuation by comparison of transmitted and received amplitudes. The elements detect the frequencies continuously or detect variation of a respective radio channel in the system at predetermined time intervals. In this manner, adaptive signal or information transmission coupled in and out is obtained as the frequency attenuation exceeds or respectively drops below the predetermined attenuation.

The arrangement also operates when a multiplexing function is in use which allows overlapping between the users. The said OFDM system is utilized for a number (small number) of users, for example four users, and operating with a substantially greater number of carrier waves, for example 128 carrier waves, whereby the element is arranged to carry out measurements and determinations of the attenuation value on all or, with optimization, a predetermined number of carrier waves.

According to the invention, there are also distinctive features regarding the operation of the element. The element is to be arranged to search for the lowest amplitude among all carrier waves affected which at that time is not allocated to any user. The element is also to seek out all users in this connection. The element is furtheremore arranged to allocate the carrier wave thus found/taken out to a user to whom a sufficient number of carrier waves has not been allocated on the occasion in question and also has most to gain by using the carrier wave found, whereby the selection criterion can be the highest amplitude in relation to the mean amplitude of the user. The element can repeat these functions until all users have been allocated as many carrier waves as are needed for the signal or information transmission in question. The element is also to repeat the functions as often as is needed in order to follow the variations of the radio channel.

Through that which has been proposed above, an effective signal and information transmission is achieved in the system. All users can obtain good quality in their radio channels. It can be mentioned in this connection that the mean power can be increased considerably for all users and an example of an increase of between 3–5 dB for all users can be achieved in spite of the fact that the attenuation can go down to minus 37 dB relative to the maximum power for certain frequencies. As an example it can be mentioned that carrier waves which are attenuated by more than minus 13 dB have not been used in the case specified here.

DESCRIPTION OF THE FIGURES

A presently proposed embodiment of an arrangement which exhibits the characteristics which are significant of the invention will be described in the text below, at the same time referring to the attached drawings, in which FIG. 3 shows, in a diagram form, frequency allocation for four users on 128 carrier waves where all users signal at 32 frequencies and where no overlap is allowed.

DESCRIPTION OF THE PREFERRED EMBODIMENT

Figure 1:
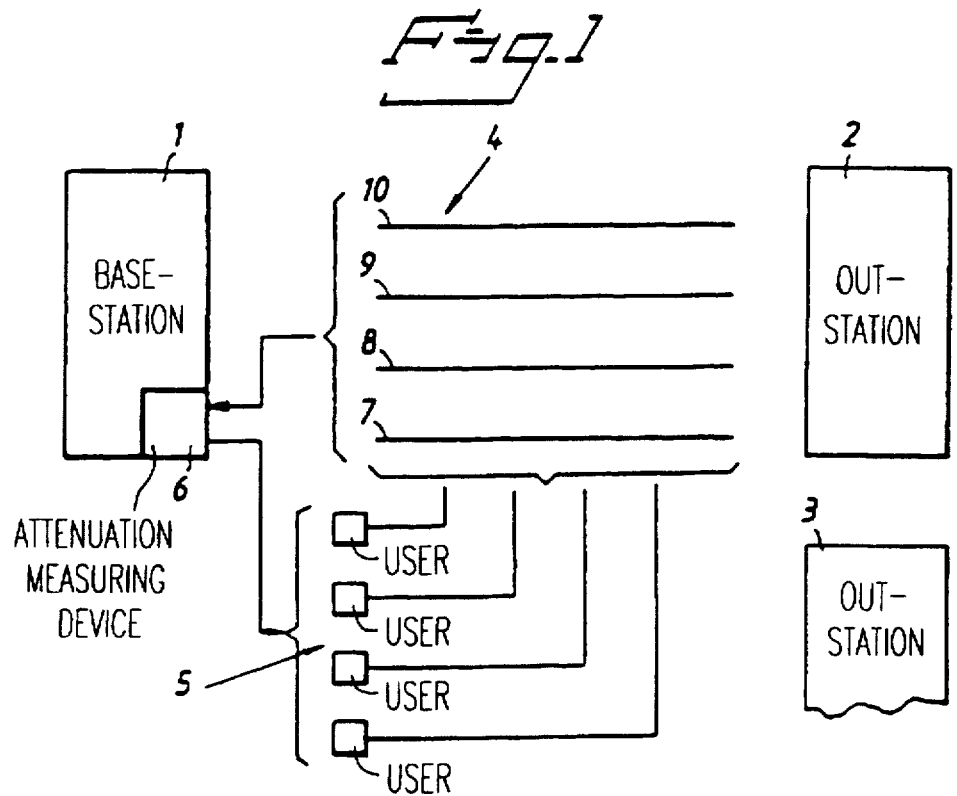
FIG. 1 shows an OFDM system with uplinks from outstations to the basestation and where frequencies are measured and distributed amongst users.
Figure 2:
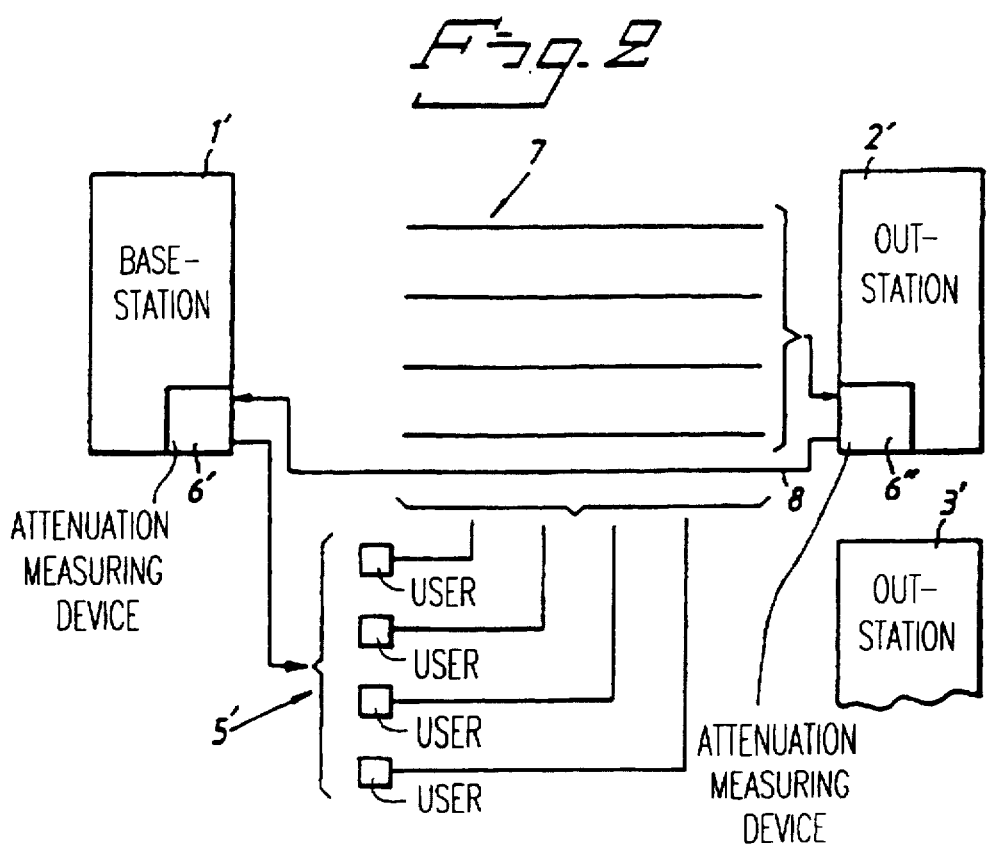
FIG. 2 shows, in a basic form, downlinks from a basestation to an outstation where the frequencies are measured in a respective outstation and the result is signalled back to the base station which carries out the frequency distribution to the users.

In FIG. 1, a basestation is designated by 1 and outstations are represented by 2 and 3. There can be several outstations. The uplinks are basically designated by 4 and users by 5. The basestation is in this case provided with an element 6 which, in a manner known per se, is arranged to measure the attenuation at respective frequencies which have been symbolized by 7, 8, 9 and 10. Depending on the measurement, different frequencies are adaptively coupled in and out. In the case where the frequencies are attenuated and assume a lowest permitted attenuation, there is no information or signal transmission via the said frequency. Instead, another frequency is selected in accordance with the present invention. The users 5 are thus assured at any instant of an adequate number of frequencies with attenuations above the said permitted attenuation. The element senses the frequencies continuously or at certain intervals which are set in accordance with the radio channels in question and ensures good transmission. The coupling together of selected frequencies and users has been symbolized by a matrix form.

The said OFDM system can also include downlinks 7 between the basestation 1' and the outstations 2' or, respectively, 3' and so forth. The elements are then arranged both at the base station and a respective outstation and have been given the designations 6' and, respectively, 6". The attenuation is measured by means of the element part at a respective outstation. The result of the measurement is transferred to the basestation, for example via a signal channel 8. The element part 6' thereafter carries out the distribution of approved frequencies to the different users 5' in a corresponding manner to that above.

The OFDM system has advantages in connection with the measuring function in that it naturally operates with a data symbol for each carrier wave used. The data symbol can be easily identified for the respective carrier wave and the attenuation can be obtained by comparing the received amplitude with the transmitted amplitude.

FIG. 3 is intended to illustrate an embodiment example in which frequency allocation has been carried out in a large OFDM system for four users and altogether 128 carrier waves. All users signal at 32 frequencies. In the present case, a multiplexing method which allows overlapping between the users has not been utilized even though such an application is possible per se. The system operates with an algorithm for frequency allocation which is simple and which has not been optimized for minimizing the quantity of data which has to be signalled to the base station in a downlink. Neither has the measuring method been optimized but, instead, it is assumed that all frequencies are measured for all users. The algorithm guarantees that the most attenuated carrier waves are not used for signalling except in the rare cases where all radio channels are weak at the same frequency.

The elements 6, 6' and 6" operate with the following algorithm:

1. Seek out the lowest amplitude among all unallocated carrier waves and all users.
2. Allocate the carrier wave found to the user who has not been allocated a sufficient number of carrier waves and who, moreover, has most to gain from using the carrier wave found, whereby the selection criterion can be the highest amplitude in relation to the mean amplitude of the user.
3. Repeat the above according to items 1 and 2 until users have obtained as many carrier waves as are needed.
4. Repeat the above according to items 1-3 as often as is needed for following the variation of the radio channel.

FIG. 3 shows the result for four users. In the upper part of the figure, the amplitudes of the four different radio channels are shown for different frequencies. The numbers in the top figure and dashes in the lower figure show which frequencies have been allocated to each user. The diagram according to FIG. 3 shows that the frequencies which have been allocated largely have the same amplitudes which lie at a maximum for all the four radio channels. This situation naturally reflects optimum conditions. It is not always possible to achieve a maximum since each user is to be allocated a certain number of carrier waves. In the example, the mean power has increased between 3 and 5 decibels for all users. Even though there are attenuations at down to minus 37 dB relative to the maximum power, no carrier wave is used which is more attenuated than minus 13 dB.

The invention is not limited to the embodiment shown in the above as an example but can be subjected to modifications within the scope of the subsequent patent claims and the concept of the invention.

We claim:

1. A multi-user radio communication system comprising:
   an outstation configured to transmit uplink signals over carrier waves at separate frequencies, separate subsets of said carrier waves being assigned as radio channels to users of said system, said radio channels being independent and uncorrelated with one another; and
   a base station configured to transmit information to said users via said radio channels, said base station comprising,
      an attenuation measuring device that receives said uplink signals from the outstation and measures an amount of attenuation on the received uplink signals and determines which of said frequencies experience more than a predetermined amount of attenuation due to multipath propagation effects, said attenuation measuring device being configured to reassign specific ones of said frequencies that experience more than said predetermined amount of attenuation with other frequencies that experience a lesser amount of attenuation, wherein
   said base station is configured to inform said users if said attenuation measuring device reassigns said respective frequencies.

2. The system of claim 1, further comprising:
   another outstation; wherein
   said base station is configured to transmit downlink signals that inform said outstation and said another outstation which of said frequencies are to be respectively transmitted from said outstation and said another outstation as said uplink signals; and said outstation and said another outstation being configured to receive said downlink signals.

3. The system of claim 2, wherein:

said outstation and said another outstation each comprise an outstation attenuation measuring device that measures an attenuation amount of respective of said frequencies based on respective attenuation measurements made on said downlink signals, said outstation attenuation measuring device being configured to report a result of said attenuation measurements to said attenuation measuring device so that frequencies are reassigned for said users based on said attenuation measurement performed by said outstation attenuation measuring device.

4. The system of claim 3, wherein:

said outstation transmits said uplink signals over said frequencies selected as orthogonal frequency division multiplex frequencies;

each uplink signal comprising a plurality of carrier waves transmitted in at least a portion said frequencies;

said outstation being configured to transmit an identifiable data symbol on respective of said carrier waves; and said attenuation measuring device of said base station being configured to determine an amount of attenuation for each of said carrier waves by comparing transmitted and received amplitudes of said carrier waves.

5. The system of claim 2, wherein:

said outstation transmits said uplink signals over said frequencies selected as orthogonal frequency division multiplex frequencies;

each uplink signal comprising a plurality of carrier waves transmitted in at least a portion said frequencies;

said outstation being configured to transmit an identifiable data symbol on respective of said carrier waves; and said attenuation measuring device of said base station being configured to determine an amount of attenuation for each of said carrier waves by comparing transmitted and received amplitudes of said carrier waves.

6. The system of claim 2, wherein:

said attenuation measuring device is configured to monitor said frequencies either continuously or to monitor said frequencies at predetermined time intervals by observing a variation in said radio channel, and being configured to adaptively reassign said frequencies based on said detected variations.

7. The system of claim 2, wherein:

said outstation and said base station remain in an operational mode of operation even when subsets of said frequencies are commonly assigned to different users so that a fraction of said frequencies in common with two different user overlap one another.

8. The system of claim 2, wherein:

said outstation is configured to transmit said uplink signals using at least 128 radio OFDM frequencies;

said attenuation measuring device being configured to inform said users of said frequencies when frequencies used by respective user have been reassigned, wherein a number of said users is less than a number of said radio OFDM frequencies; and said attenuation measuring device comprising means for determining whether said OFDM frequencies respectively experience more than said predetermined attenuation amount, and comprising optimization means for identifying an optimum number of OFDM frequencies on which to determine if more than said predetermined amount of attenuation is experienced thereon.

9. The system of claim 8, wherein said means for determining allocates frequencies having a substantially maximum amplitude to said radio channels.

10. The system of claim 2, wherein said attenuation measuring device comprises:

means for identifying unassigned frequencies and respective amplitudes of said unassigned frequencies from said uplink signals; and means for assigning a subset of said unassigned frequencies to said users which do not yet have a complete complement of frequencies, said means for assigning being configured to assign said unassigned frequencies based on a comparison of a highest amplitude of an unassigned frequency in comparison to a mean amplitude of other frequencies assigned to said user, said means for assigning being configured to allocate said unassigned frequencies to all of said users until all of said users have a complete complement of frequencies assigned thereto.

11. The system of claim 2, wherein:

said attenuation measuring device comprises means for allocating a same number of frequencies to each the users; and said attenuation measuring device comprises means for detecting amplitudes of signals carried at each frequency either continuously or at periodic intervals, and is configured to change assignments of frequencies to said users based on a variation of said amplitudes of said signals.

12. The system of claim 1, wherein:

said outstation comprises an outstation attenuation measuring device that measures an attenuation amount of respective of said frequencies based on respective attenuation measurements made on said downlink signals, said outstation attenuation measuring device being configured to report a result of said attenuation measurements to said attenuation measuring device so that frequencies are reassigned for said users based on said attenuation measurement performed by said outstation attenuation measuring device.

13. The system of claim 12, wherein:

said outstation transmits said uplink signals over said frequencies selected as orthogonal frequency division multiplex frequencies;

each uplink signal comprising a plurality of carrier waves transmitted in at least a portion said frequencies;

said outstation being configured to transmit an identifiable data symbol on respective of said carrier waves; and said attenuation measuring device of said base station being configured to determine an amount of attenuation for each of said carrier waves by comparing transmitted and received amplitudes of said carrier waves.

14. The system of claim 1, wherein:

said outstation transmits said uplink signals over said frequencies selected as orthogonal frequency division multiplex frequencies;

each uplink signal comprising a plurality of carrier waves transmitted in at least a portion said frequencies;

said outstation being configured to transmit an identifiable data symbol on respective of said carrier waves; and said attenuation measuring device of said base station being configured to determine an amount of attenuation for each of said carrier waves by comparing transmitted and received amplitudes of said carrier waves.

15. The system of claim 1, wherein:

said attenuation measuring device is configured to monitor said frequencies either continuously or to monitor said frequencies at predetermined time intervals by observing a variation in said radio channel, and being configured to adaptively reassign said frequencies based on said detected variations.

16. The system of claim 1, wherein:

said outstation and said base station remain in an operational mode of operation even when subsets of said frequencies are commonly assigned to different users so that a fraction of said frequencies in common with two different user overlap one another.

17. The system of claim 1, wherein:

said outstation is configured to transmit said uplink signals using at least 128 radio OFDM frequencies;

said attenuation measuring device being configured to inform said users of said frequencies when frequencies used by respective user have been reassigned, wherein a number of said users is less than a number of said radio OFDM frequencies; and said attenuation measuring device comprising means for determining whether said OFDM frequencies respectively experience more than said predetermined attenuation amount, and comprising optimization means for identifying an optimum number of OFDM frequencies on which to determine if more than said predetermined amount of attenuation is experienced thereon.

18. The system of claim 17, wherein said means for determining allocates frequencies having a substantially maximum amplitude to said radio channels.

19. The system of claim 1, wherein said attenuation measuring device comprises:

means for identifying unassigned frequencies and respective amplitudes of said unassigned frequencies from said uplink signals; and means for assigning a subset of said unassigned frequencies to said users which do not yet have a complete complement of frequencies, said means for assigning being configured to assign said unassigned frequencies based on a comparison of a highest amplitude of an unassigned frequency in comparison to a mean amplitude of other frequencies assigned to said user, said means for assigning being configured to allocate said unassigned frequencies to all of said users until all of said users have a complete complement of frequencies assigned thereto.

20. The system of claim 1, wherein:

said attenuation measuring device comprises means for allocating a same number of frequencies to each the users; and said attenuation measuring device comprises means for detecting amplitudes of signals carried at each frequency either continuously or at periodic intervals, and is configured to change assignments of frequencies to said users based on a variation of said amplitudes of said signals.

\* \* \* \* \*